United States Patent
Joslin

(10) Patent No.: US 9,174,292 B2
(45) Date of Patent: Nov. 3, 2015

(54) ELECTRO CHEMICAL GRINDING (ECG) QUILL AND METHOD TO MANUFACTURE A ROTOR BLADE RETENTION SLOT

(75) Inventor: Frederick Joslin, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1667 days.

(21) Appl. No.: 12/103,722

(22) Filed: Apr. 16, 2008

(65) Prior Publication Data

US 2009/0260994 A1    Oct. 22, 2009

(51) Int. Cl.
- B23H 9/10 (2006.01)
- B23H 5/06 (2006.01)
- B24B 19/02 (2006.01)
- B23H 5/04 (2006.01)

(52) U.S. Cl.
CPC .. *B23H 5/06* (2013.01); *B23H 5/04* (2013.01); *B23H 9/10* (2013.01); *B24B 19/02* (2013.01)

(58) Field of Classification Search
USPC ......................................................... 205/653
See application file for complete search history.

(56) References Cited

U.S. PATENT DOCUMENTS

| | | | |
|---|---|---|---|
| 1,614,558 A | 1/1927 | Kasley | |
| 2,293,084 A | 8/1942 | Sedam | |
| 3,202,595 A * | 8/1965 | Inoue | 205/654 |
| 3,593,574 A | 7/1971 | Omholt | |
| 3,690,162 A | 9/1972 | Stecher | |
| 3,802,255 A | 4/1974 | Struthers et al. | |
| 4,478,086 A | 10/1984 | Gram | |
| 4,537,538 A | 8/1985 | Mitamura et al. | |
| D287,932 S | 1/1987 | Seward et al. | |
| 5,112,193 A | 5/1992 | Greer et al. | |
| 5,388,464 A | 2/1995 | Maddison | |
| 5,518,369 A | 5/1996 | Modafferi | |
| 5,567,116 A | 10/1996 | Bourcier | |
| 5,863,183 A | 1/1999 | Dierksmeier et al. | |
| 5,931,616 A | 8/1999 | Daub | |
| 5,952,581 A | 9/1999 | Lammers et al. | |
| 5,984,639 A | 11/1999 | Gekht et al. | |
| 6,023,980 A | 2/2000 | Owen et al. | |
| 6,077,035 A | 6/2000 | Walters et al. | |
| 6,109,877 A | 8/2000 | Gekht et al. | |
| 6,250,166 B1 | 6/2001 | Dingwell et al. | |
| 6,302,651 B1 | 10/2001 | Kildea et al. | |
| 6,322,296 B1 | 11/2001 | Wetli et al. | |
| 6,454,922 B1 * | 9/2002 | Weisbrod | 204/404 |
| 6,533,550 B1 | 3/2003 | Mills | |
| 6,601,456 B1 | 8/2003 | Davidson et al. | |
| 6,680,454 B1 * | 1/2004 | Batzinger et al. | 219/69.15 |
| 6,718,833 B2 | 4/2004 | Xie et al. | |

(Continued)

FOREIGN PATENT DOCUMENTS

| WO | WO 86/00252 A | * | 1/1986 |
|---|---|---|---|
| WO | WO 8600252 A | * | 1/1986 |

OTHER PUBLICATIONS

Translation of WO 8600252 A (same patent family, EP 185091 A1, Jun. 25, 1986).*

*Primary Examiner* — Nicholas A Smith
(74) *Attorney, Agent, or Firm* — Carlson, Gaskey & Olds P.C.

(57) ABSTRACT

An Electro Chemical Grinding (ECG) quill includes a tool manufactured of a porous tool material having a multitude of pores. An ECG electrolyte is communicated through a hollow tool shank for communication through the porous tool material to manufacture a slot.

20 Claims, 7 Drawing Sheets

(56) References Cited

U.S. PATENT DOCUMENTS

| | | |
|---|---|---|
| 6,732,591 B2 | 5/2004 | Miles et al. |
| 6,813,960 B1 | 11/2004 | Owen et al. |
| 6,837,686 B2 | 1/2005 | Di Paola et al. |
| 6,848,311 B1 | 2/2005 | Hull |
| 6,883,234 B2 | 4/2005 | Packman et al. |
| 7,007,382 B2 | 3/2006 | Mantel |
| 7,118,346 B2 | 10/2006 | Read |
| 7,144,482 B2 * | 12/2006 | Steele et al. ............. 204/224 M |
| 7,192,245 B2 | 3/2007 | Djeridane et al. |
| 7,204,153 B2 | 4/2007 | Phipps |
| 2002/0017144 A1 | 2/2002 | Miles et al. |
| 2005/0274625 A1 * | 12/2005 | Joslin ........................... 205/640 |

* cited by examiner

```
┌─────────────────────────────────────────┐
│ DRILL CENTRAL BLIND HOLE WITH AN ELECTRICAL │
│ DISCHARGE MACHINE (EDM) DRILL WITH POROUS   │
│ TOOL MATERIAL SUBMERGED IN EDM DRILL FLUID  │
│ WHILE A VACUUM IS APPLIED TO THE TUBULAR    │
│ EDM DRILL ELECTRODE SUCH THAT THE EDM FLUID │
│ ENTERS THE POROUS TOOL MATERIAL THROUGH THE │
│ PORES AND EXITS THROUGH THE ROTATING TUBULAR│
│ EDM DRILL ELECTRODE.                        │
└─────────────────────────────────────────┘
                    │
                    ▼
┌─────────────────────────────────────────┐
│ FIX HOLLOW SHANK WITHIN THE CENTRAL BLIND │
│ HOLE OF THE POROUS TOOL MATERIAL TO FORM A│
│ SHAFT.                                    │
└─────────────────────────────────────────┘
                    │
                    ▼
┌─────────────────────────────────────────┐
│ FORM CONVOLUTED OUTER SURFACE BY ROTATION OF│
│ THE POROUS TOOL MATERIAL AGAINST AN EDM     │
│ WIRE TO PRODUCE THE DESIRED THREE           │
│ DIMENSIONAL SHAPE WHILE EDM FLUID IS        │
│ PUMPED THROUGH THE HOLLOW SHANK SUCH THAT   │
│ THE EDM FLUID FLOWS THROUGH THE PORES OF    │
│ THE POROUS TOOL MATERIAL.                   │
└─────────────────────────────────────────┘
                    │
                    ▼
┌─────────────────────────────────────────┐
│ FILL THE PORES FLUSH WITH THE SURFACE OF THE│
│ CONVOLUTED OUTER SURFACE WITH ELECTRICALLY  │
│ INSULATING SEALANT MATERIAL.                │
└─────────────────────────────────────────┘
                    │
                    ▼
┌─────────────────────────────────────────┐
│ ELECTROPLATED WITH ABRASIVE GRAINS EXPOSED  │
│ METAL SURFACES BETWEEN THE PORES TO FORM A  │
│ CUTTING SURFACE.                            │
└─────────────────────────────────────────┘
                    │
                    ▼
┌─────────────────────────────────────────┐
│ REMOVE ELECTRICAL INSULATING MATERIAL.      │
└─────────────────────────────────────────┘
```

ELECTRO CHEMICAL GRINDING (ECG) QUILL AND METHOD TO MANUFACTURE A ROTOR BLADE RETENTION SLOT

BACKGROUND

The present invention relates to a gas turbine engine, and more particularly to process tooling and procedures to machine blade retention slots within a rotor disk.

Burr removal from rotor disk blade retention slots may be relatively difficult because of the random occurrence and varying nature of Super Abrasive Machining (SAM) burrs. One rotor disk may require many hours of skilled manual de-burring. In addition to such significant time requirements, manual de-burring involves the risk of errors which may scrap the entire rotor disk.

SUMMARY

An Electro Chemical Grinding (ECG) quill according to an exemplary aspect of the present invention includes: a shaft defined along an axis; and a tool mounted to the shaft, the tool manufactured of a porous tool material having a multitude of pores which extend from the shaft to an outer surface.

An Electro Chemical Grinding (ECG) quill according to an exemplary aspect of the present invention includes: a shaft defined along an axis, the shaft comprises a hollow shank which defines a multiple of apertures transverse to the axis; and a tool mounted to the shaft, the tool manufactured of a porous tool material having a multitude of pores in fluid communication with the hollow shank through the multiple of apertures.

A method of machining a slot according to an exemplary aspect of the present invention includes: communicating an Electro Chemical Grinding (ECG) electrolyte through a hollow tool shank for communication through a tool manufactured of a porous tool material.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 4 is a flowchart which illustrates one non-limiting embodiment of a manufacturing method for the Electro Chemical Grinding (ECG) quill;

DETAILED DESCRIPTION OF THE EXEMPLARY EMBODIMENTS

Figure 1:
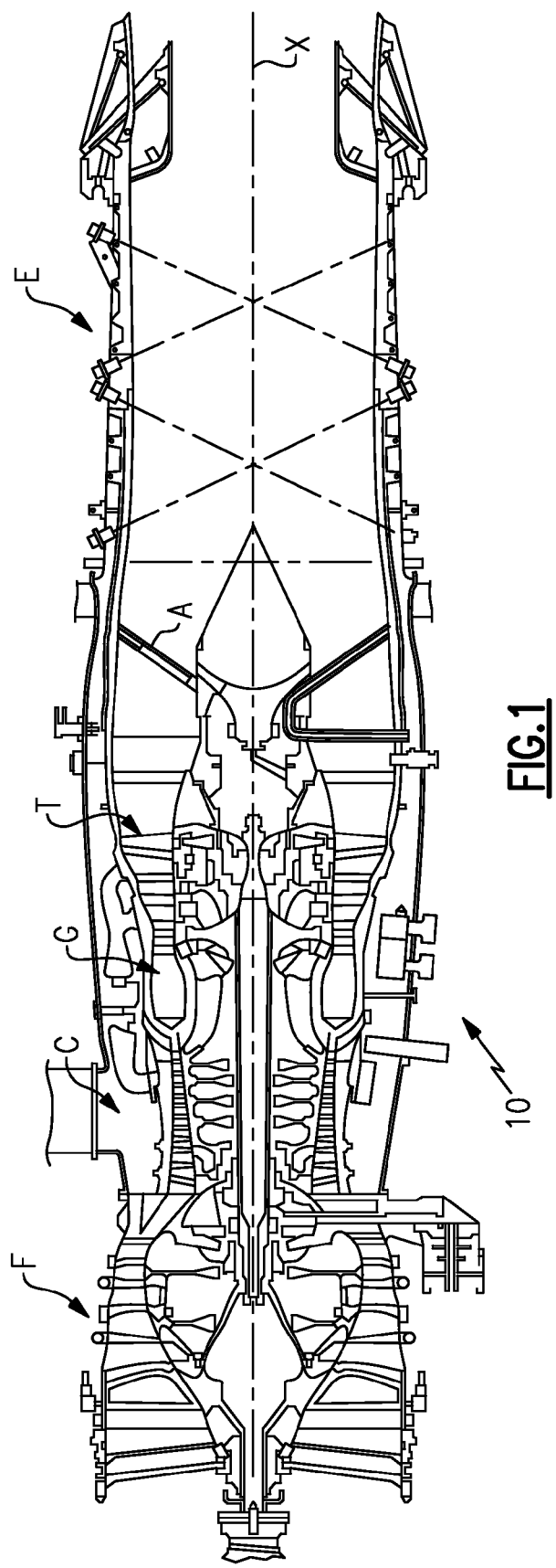
FIG. 1 is a schematic illustration of a gas turbine engine.

FIG. 1 schematically illustrates a gas turbine engine 10 which generally includes a fan section F, a compressor section C, a combustor section G, a turbine section T, an augmentor section A, and an exhaust duct assembly E. The compressor section C, combustor section G, and turbine section T are generally referred to as the core engine. An engine longitudinal axis X is centrally disposed and extends longitudinally through these sections. Although a particular engine configuration is illustrated and described in the disclosed embodiment, other engines will also benefit herefrom.

Figure 2A:
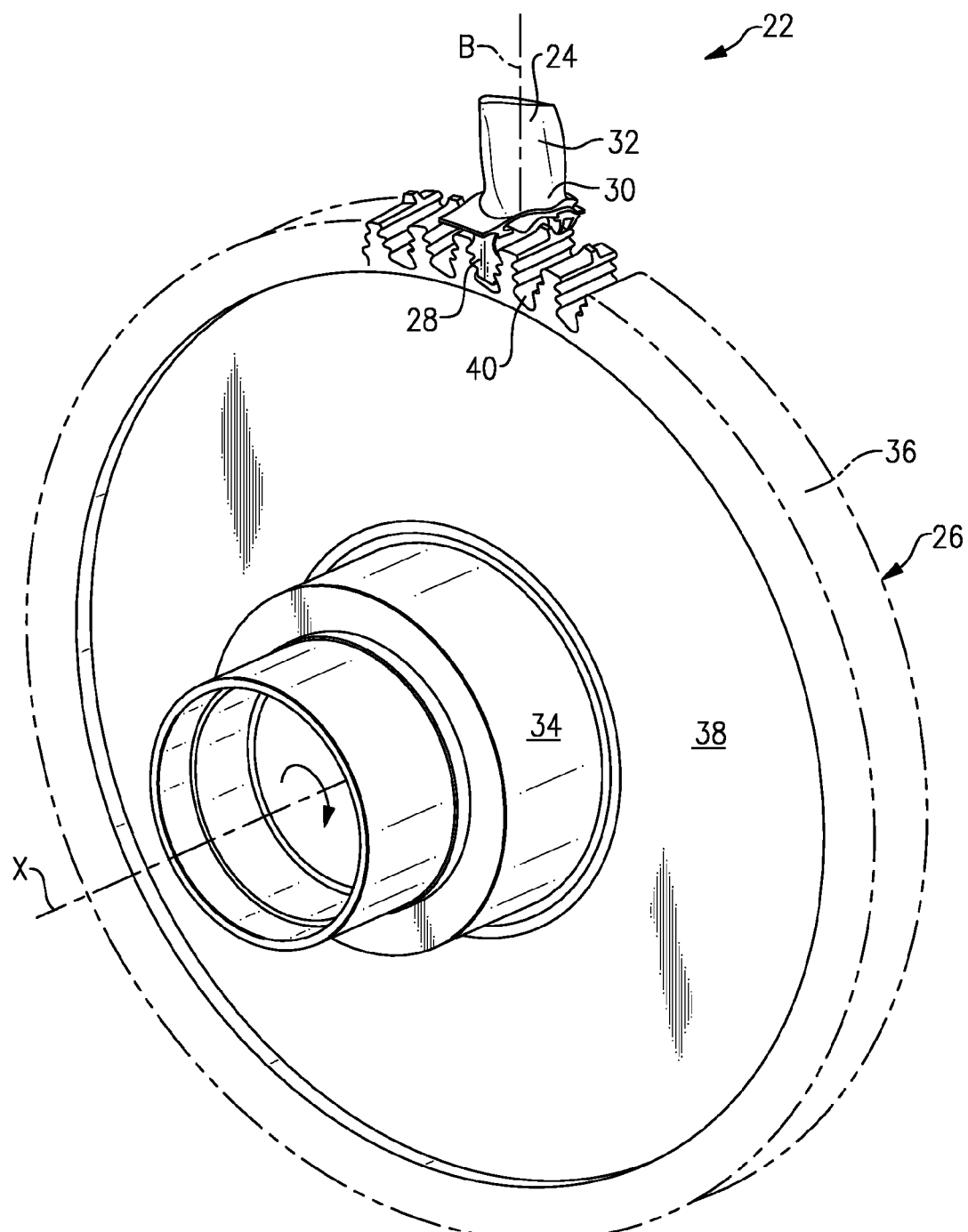
FIG. 2A is an expanded perspective view of a single rotor blade mounted to a rotor disk.
Figure 2B:
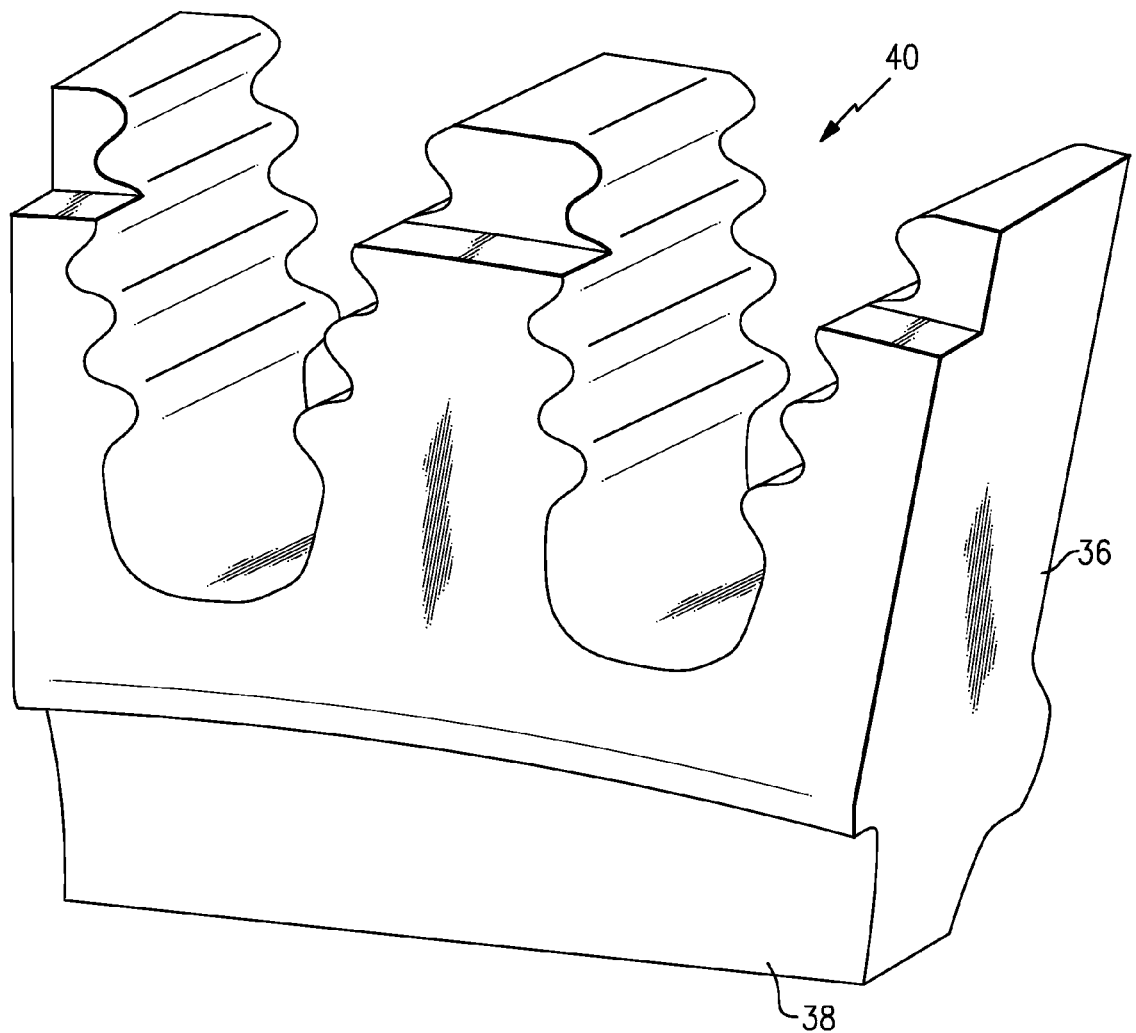
FIG. 2B is an expanded view of a blade retention slot of the rotor disk of FIG. 2.

Referring to FIG. 2, a rotor assembly 22 such as that of a first or second stage HPT (High Pressure Turbine disk assembly) of the gas turbine engine 10 is illustrated. It should be understood that a multiple of rotor disks may be contained within each engine section such as a fan section, a compressor section and, a turbine section. Although a particular rotor assembly 22 is illustrated and described in the disclosed embodiment, other sections which have other blades such as fan blades, low pressure turbine blades, high pressure turbine blades, high pressure compressor blades and low pressure compressor blades will also benefit herefrom.

The rotor assembly 22 includes a plurality of blades 24 circumferentially disposed around a rotor disk 26. Each blade 24 generally includes an attachment section 28, a platform section 30, and an airfoil section 32 along a radial axis B. The rotor disk 26 generally includes a hub 34, a rim 36, and a web 38 which extends therebetween. Each of the blades 24 is received within a blade retention slot 40 formed within the rim 36 of the rotor disk 26 (also illustrated in FIG. 2B). The blade retention slot 40 includes a contour such as a fir-tree or bulb type which corresponds with a contour of the attachment section 28 to provide engagement therewith.

Figure 3:
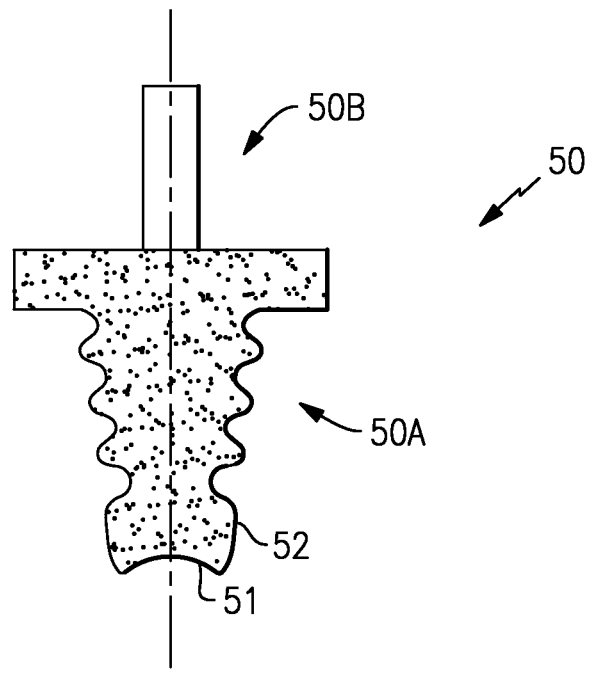
FIG. 3 is a perspective view of one non-limiting embodiment of the Electro Chemical Grinding (ECG) quill to machine and deburr the blade retention slot of the rotor disk of FIG. 2B.

Referring to FIG. 3, an Electro Chemical Grinding (ECG) quill 50 includes a tool 50A with a shaped outer surface 52 mounted to a shaft 50B for the machining of the blade retention slot 40 with maximal metallurgical quality, minimum surface irregularity and no burrs. Although a fir-tree type convoluted outer surface 52 for the machining of the blade retention slot 40 is illustrated in the disclosed embodiment, it should be understood that any shaped outer surface 52 to produce a desired blade retention slot 40 may be provided. A bottom surface 51 of the tool 50A opposite the shaft 50B may be relieved to avoid a zero Surface Feet per Minute (SFM) condition.

Figure 5:
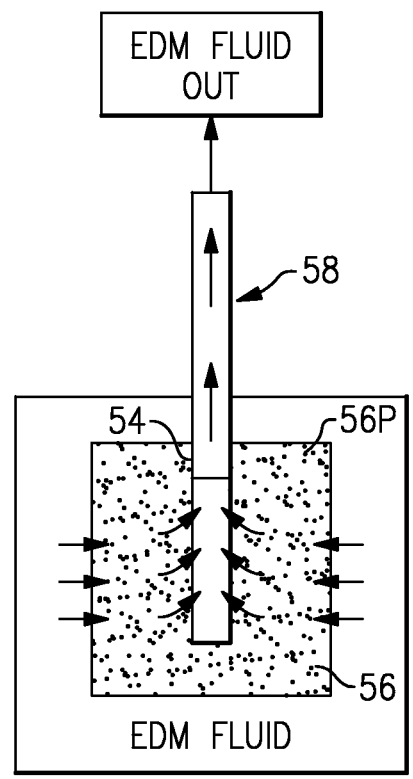
FIG. 5 is a schematic illustration of one step of the manufacturing method for the Electro Chemical Grinding (ECG) quill which drills a central blind hole in a porous tool material.

Referring to FIG. 4, the ECG quill 50 is manufactured with a central blind hole 54 which may be Electrical Discharge Machine (EDM) drilled into a porous tool material 56 such as a cylindrical block of 316N1 stainless 100 micron porous metal such as that produced by Mott Metallurgical of Farmington Conn., USA. The porous tool material 56 defines a multitude of capillary-type pores 56P which extend throughout the material. The central blind hole 54 may be manufactured with a tubular EDM drill electrode 58 while the porous tool material is submerged in EDM drill fluid such that the EDM fluid enters the porous tool material 56 from the outer surface thereof and exits through the tubular EDM drill electrode 58 to avoid EDM detritus from being trapped in the pores 56P. In one non-limiting embodiment, the porous tool material 56 is immersed in filtered EDM drill fluid and a vacuum is applied to the tubular EDM drill electrode 58 (FIG. 5) to manufacture the central blind hole 54.

The shaft 50B defines an axis of rotation A and includes a hollow shank section 60. The hollow shank section 60 of the ECG quill 50 is fixed within the central blind hole 54 of the porous tool material 56. The hollow shank section 60 includes a multiple of apertures 62 transverse to the axis of rotation A. It should be understood that the hollow shank section 60 may define a portion of or the entire shaft 50B. Furthermore, various apertures 62 in various locations may be provided other than those illustrated.

Figure 6:
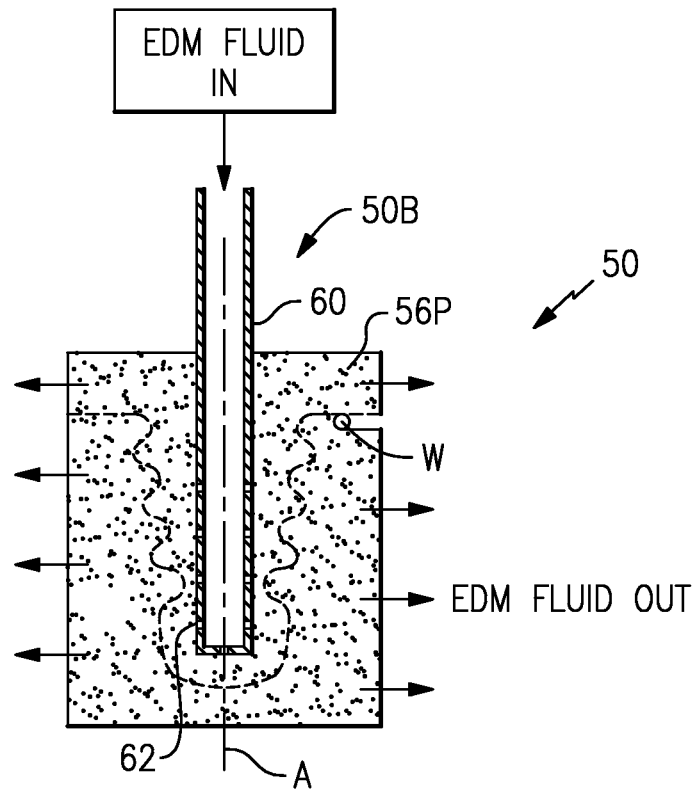
FIG. 6 is a schematic illustration of the manufacturing method for the Electro Chemical Grinding (ECG) quill which forms a convoluted outer surface while EDM fluid is pumped though the hollow shank such that the EDM fluid flows through the pores of the porous tool material.

The shaped outer surface 52 is formed by rotating the hollow shank section 60 to rotate the porous tool material 56 against an EDM wire W (FIG. 6) to produce the desired three dimensional shape. So as to avoid EDM detritus from being trapped in the pores of the porous tool material 56, EDM fluid is pumped though the hollow shank section 60 such that the EDM fluid flows outwardly through the pores 56P of the porous tool material 56.

Figure 7:
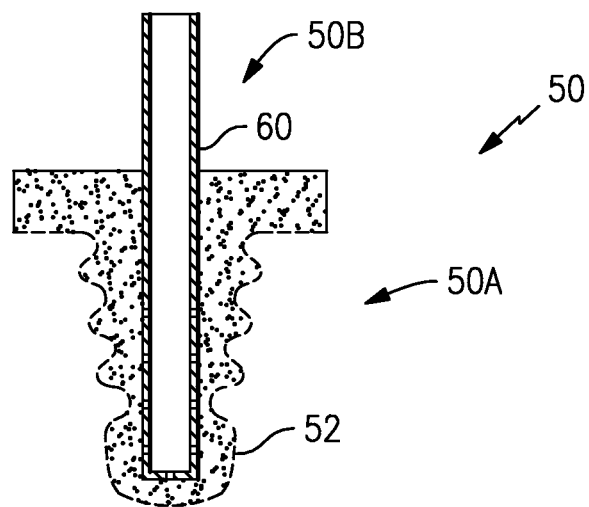
FIG. 7 is a schematic sectional view of one non-limiting embodiment of the Electro Chemical Grinding (ECG) quill.

A suitable electrically insulating sealant material such as a wax is then used to fill the surface pores 56P flush with the surface of the convoluted outer surface 52. The electrically insulating sealant material fills the pores 56P such that the exposed metal surfaces between the pores 56P of the shaped outer surface 52 is prepared for subsequent electroplating. The exposed metal surfaces of the shaped outer surface 52 between the pores 56P are then electroplated with abrasive grains to form a cutting surface such as that provided by Ernst Winters & Son of Travelers Rest, S.C. USA. Once the convoluted outer surface 52 is electroplated, the electrical insulating material is removed though, for example only, vaporization in a vacuum oven to produce the finished quill 50 (FIG. 7).

Figure 8:
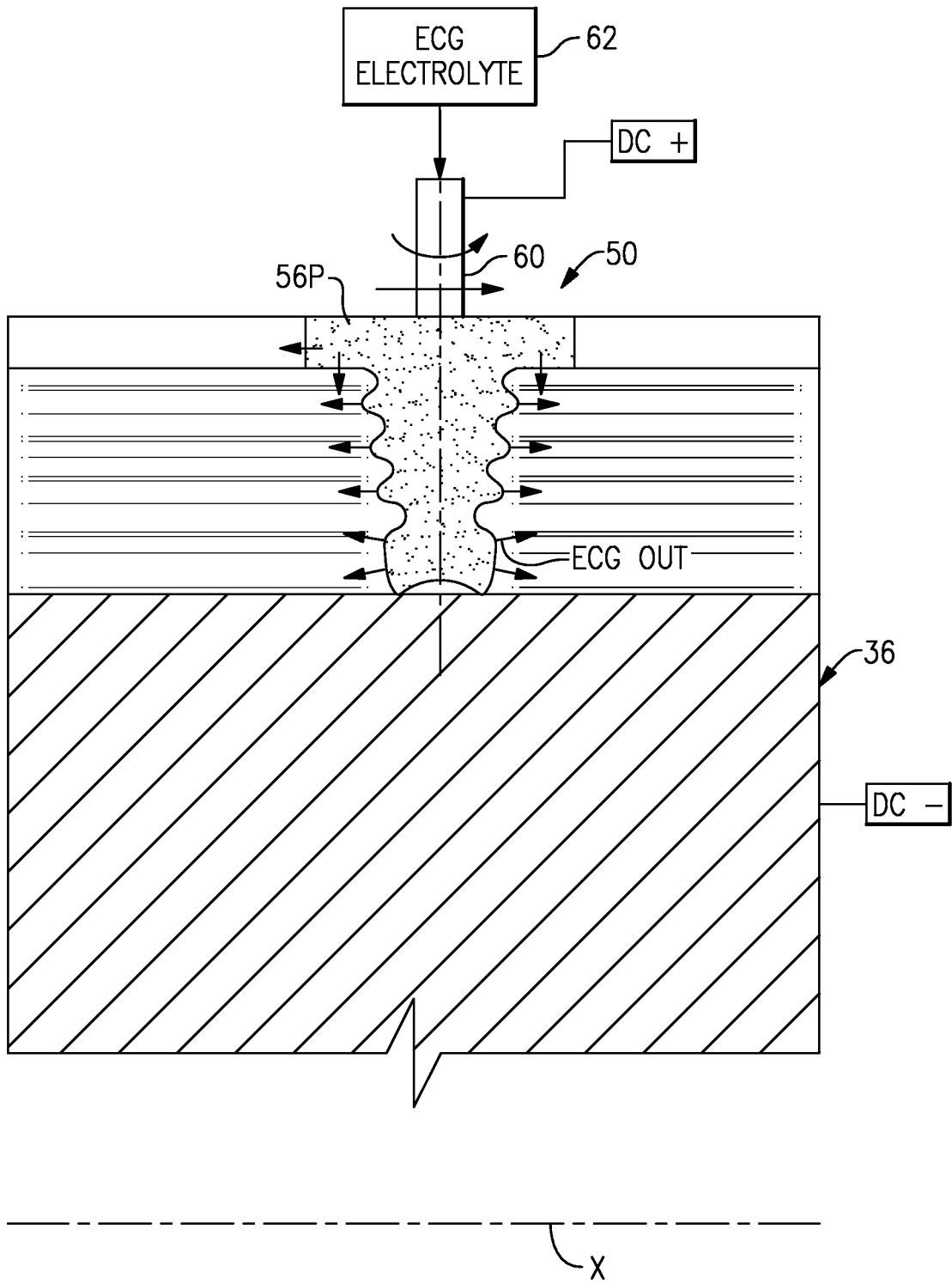
FIG. 8 is a sectional view through a rotor disk illustrating the Electro Chemical Grinding (ECG) quill to machine and deburr the blade retention slot of the rotor disk of FIG. 2B.

Referring to FIG. 8, filtered and pressurized ECG electrolyte is communicated from a source 62 though the hollow shank 60 for communication through the pores 56P of the porous tool material 56 to exit uniformly over the abrasive grains on the entire shaped outer surface 52 during operation of the ECG quill 50. The ECG slot machining typically includes two passes: a rough pass at ~0.5 IPM (Inches Per Minute) feed rate followed by a finish pass with ~0.005" engagement at ~6.0 IPM feed rate. The ECG quill 50 is rotated and moved along the rim 36 of the rotor disk 26 to machine and deburr the blade retention slot 40. A Direct Current (DC) ECG supply voltage is typically connected to the shaft 50B negative (−) and to the workpiece W positive (+).

The ECG quill 50 provides a uniform and positive electrolyte flow rate through all surfaces of the abrasive coated porous tool material 56 of the tool 50B regardless of whether the shaped outer surface 52 surfaces are not engaged, partially engaged or fully engaged against a workpiece such as the blade retention slot 40 of the rotor disk 26. This assures that the abrasive grains are continually supplied with fresh, cool and clean electrolye whether or not engaged against the workpiece.

The EDM fluid source 62 communicates the fluid through the hollow shank 60 to feed the multitude of pores 56P. Each pore 56P operates hydraulically as an individual capillary-type high L/D (Length to Diameter) flow rate system to ensuring a nearly constant flow rate thru each pore 56P regardless of the number of pores 56P that are engaged. That is, the damper effect of the multitude of capillary-type pores 56P assures that electrolyte is not diverted away from the engaged areas such that the pores 56P, all those engaged with the workpiece and all those not engaged remain fully pressurized. This assures a relatively low flow rate per unit area system in which the porous tool material 56 essentially secretes electrolyte at all times that surrounds and encapsulates all abrasive grains with fresh, cool and clean electrolyte during ECG machining at all times during quill 50 operation.

To minimize ECG time, roughing passes may be made with grinding, broaching, or other machining techniques such as conventional Super Abrasive Machining (SAM) processing. Appropriately conventional grinding shaped cup wheels may be used to rough machine longitudinally curved blade retention slots. The bottom of the slot may be subsequently finished with a tilted tool pass as described in U.S. Pat. No. 7,007,382 which is assigned to the assignee of the instant invention and which is hereby incorporated herein in its entirety.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An Electro Chemical Grinding (ECG) quill comprising: a shaft defined along an axis of rotation; and
a tool mounted to said shaft, said tool manufactured of a porous tool material having a multitude of pores, disposed throughout the porous tool material, which extend from said shaft to an outer surface, said tool symmetrical defined about said axis of rotation.

2. The ECG quill as recited in claim 1, wherein said porous tool material comprises a 316N1 stainless 100 micron porous metal.

3. The ECG quill as recited in claim 1, wherein said outer surface comprises a shaped outer surface.

4. The ECG quill as recited in claim 3, wherein said shaped outer surface comprises a three-dimensional fir-tree shape.

5. The ECG quill as recited in claim 1, further comprising abrasive grains electroplated to said porous tool material to define a cutting surface.

6. The ECG quill as recited in claim 1, wherein a bottom surface of said tool opposite said shaft is relieved.

7. The ECG quill as recited in claim 1, wherein said shaft comprises a hollow shank which defines a multiple of apertures transverse to said axis, said multitude of pores in fluid communication with said hollow shank.

8. The ECG quill as recited in claim 7, wherein each of said multitude of pores operates hydraulically as an individual, high UD (Length to Diameter) flow rate system to ensuring a nearly constant flow rate therethrough.

9. An Electro Chemical Grinding (ECG) quill comprising:
a shaft defined along an axis of rotation, said shaft comprises a hollow shank which defines a multiple of apertures transverse to said axis; and
a tool mounted to said shaft, said tool manufactured of a porous tool material having a multitude of pores, wherein the multitude of pores are randomly arranged, in fluid communication with said hollow shank through said multiple of apertures, said tool symmetrical defined about said axis of rotation.

10. The ECG quill as recited in claim 9, wherein said porous tool material comprises a 316N1 stainless 100 micron porous metal.

11. The ECG quill as recited in claim 9, wherein each of said multitude of pores operates hydraulically as an individual, high L/D (Length to Diameter) flow rate system to ensuring a nearly constant flow rate therethrough.

12. The ECG quill as recited in claim 9, wherein said outer surface comprises a convoluted outer surface.

13. The ECG quill as recited in claim 12, wherein said convoluted outer surface comprises a three-dimensional fir-tree shape.

14. A method of machining a slot comprising:
communicating an Electro Chemical Grinding (ECG) electrolyte through a hollow tool shank defined along an axis of rotation for communication through a tool symmetrical defined about the axis of rotation, the tool manufactured of a porous tool material as said tool is rotated about said axis of rotation.

15. A method as recited in claim 14, further comprising:
attaching a direct Current (DC) ECG supply voltage to the hollow tool shank and to a workpiece.

16. A method as recited in claim 14, further comprising:
communicating the ECG electrolyte to exit uniformly from an outer surface of the tool.

17. The ECG quill as recited in claim 1, wherein said shaft includes a multiple of apertures transverse to said axis of rotation.

18. The ECG quill as recited in claim 1, wherein said shaft is fixed within a central blind hole of said tool.

19. The ECG quill as recited in claim 1, wherein the multitude of pores are randomly arranged.

20. The method as recited in claim 14, wherein the porous tool material includes a multitude of randomly arranged pores.

* * * * *

UNITED STATES PATENT AND TRADEMARK OFFICE
CERTIFICATE OF CORRECTION

| | | |
|---|---|---|
| PATENT NO. | : 9,174,292 B2 | Page 1 of 1 |
| APPLICATION NO. | : 12/103722 | |
| DATED | : November 3, 2015 | |
| INVENTOR(S) | : Frederick Joslin | |

It is certified that error appears in the above-identified patent and that said Letters Patent is hereby corrected as shown below:

IN THE CLAIMS:

In claim 8, column 5, line 3; delete "UD" and replace with --L/D--

Signed and Sealed this
Eighth Day of March, 2016

Michelle K. Lee
*Director of the United States Patent and Trademark Office*